Feb. 22, 1927.
F. JORDAN
1,618,535
TRACK BRAKE
Filed Jan. 4. 1924    3 Sheets-Sheet 1
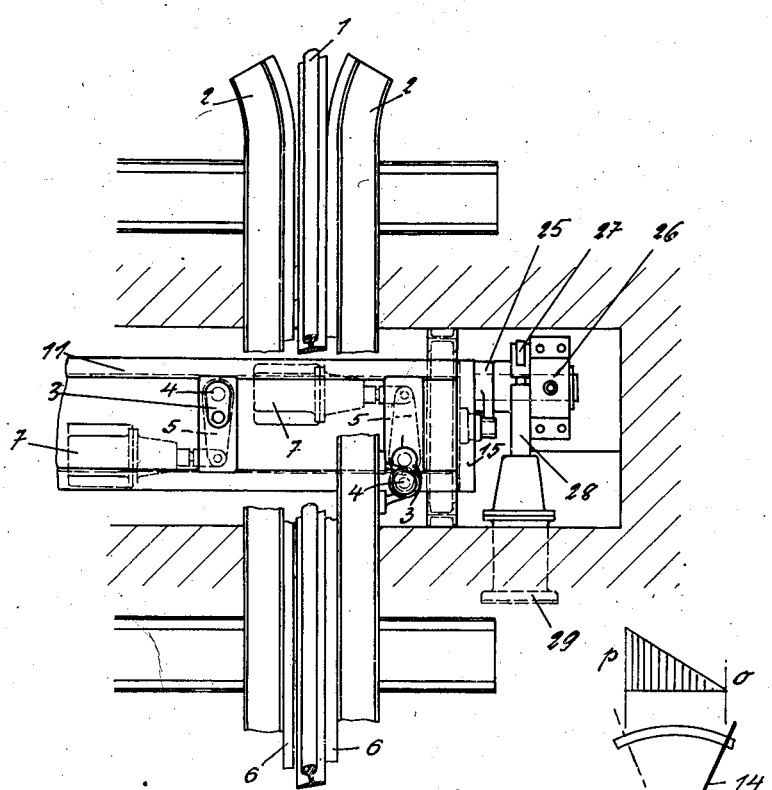
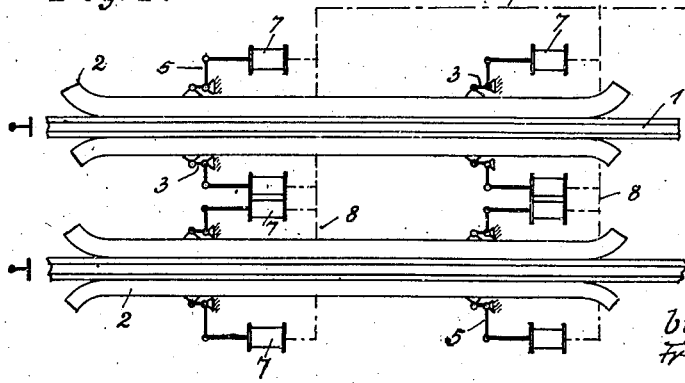
Inventor:
Franz Jordan
by
Franz Neinhold
Attorney.

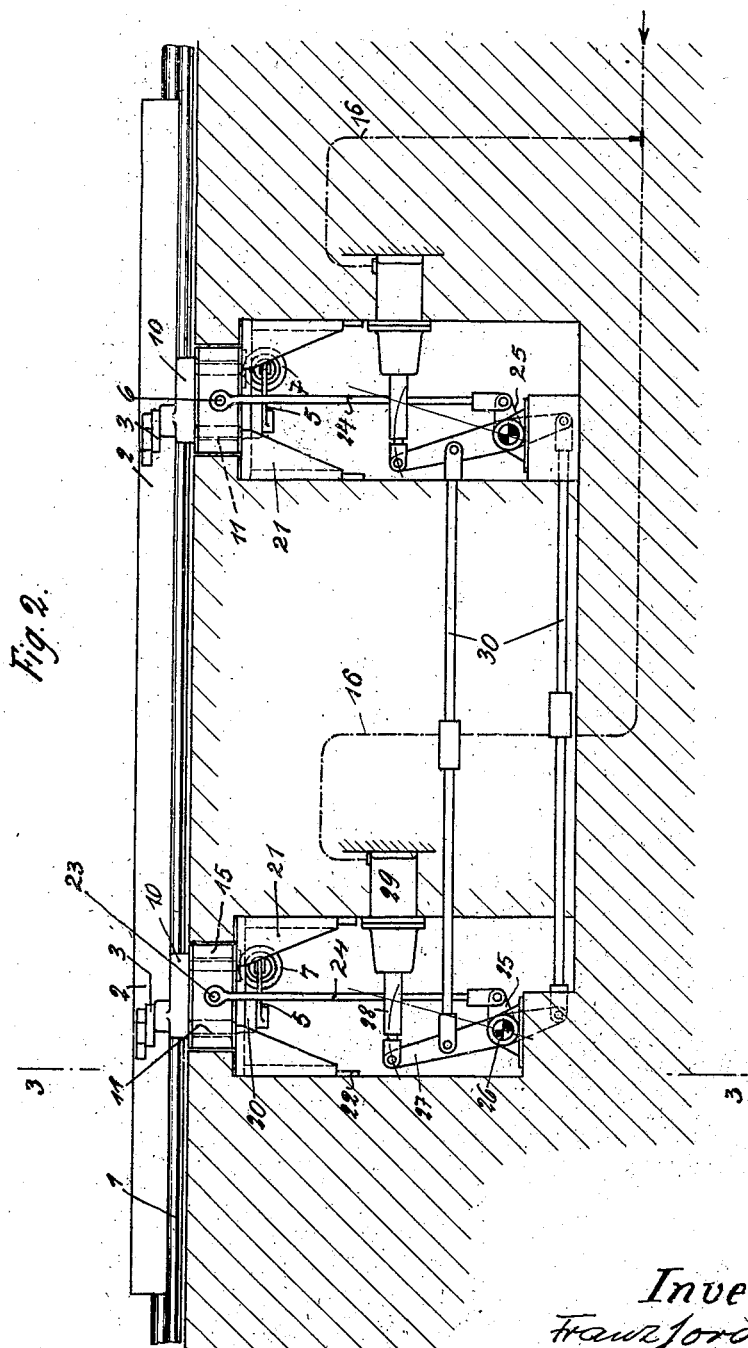

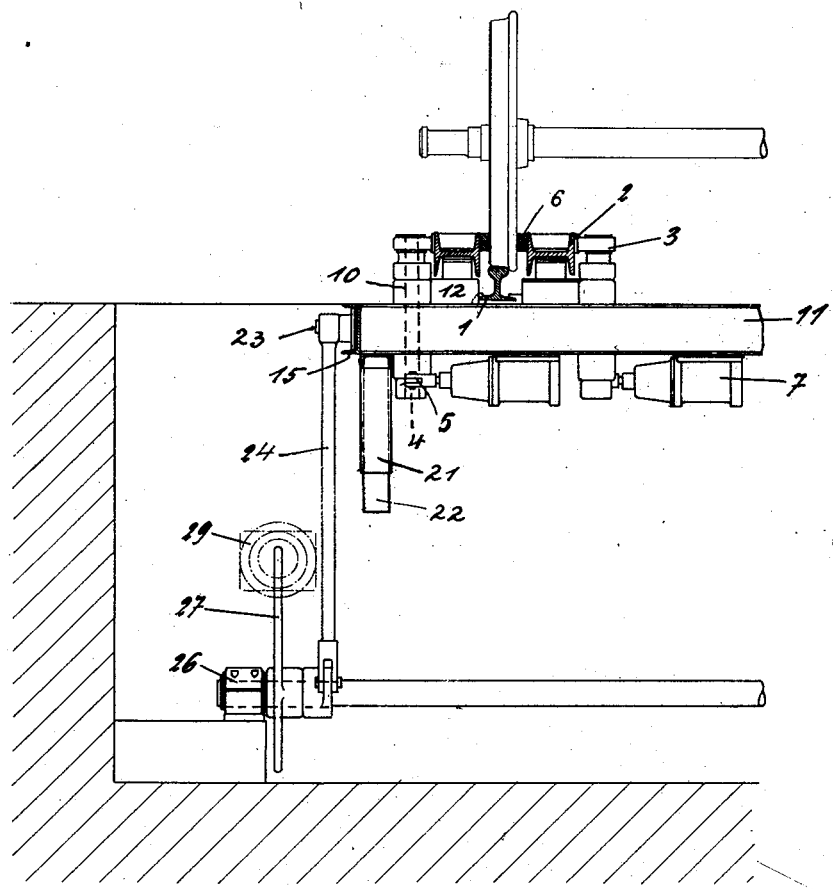

Patented Feb. 22, 1927.

1,618,535

UNITED STATES PATENT OFFICE.

FRANZ JORDAN, OF BERLIN-LICHTERFELDE, GERMANY.

TRACK BRAKE.

Application filed January 4, 1924, Serial No. 684,366, and in Germany December 29, 1922.

My invention relates to improvements in track brakes, and more particularly in brakes of the class comprising brake beams disposed alongside the rails and movable towards and away from the same for engaging the wheels of the cars from opposite sides. One of the objects of the improvements is to provide a brake of this type in which the brake beams are pressed with uniform pressure against the opposite faces of the wheels, so that the forces acting on the wheels are balanced. Another object of the improvements is to provide a brake in which the brake shoes have a large surface contact with the wheels. With these and other objects in view I connect the brake operating mechanism with the brake beams in such a way that the said beams are movable independently of one another towards and away from the wheels, and I mount the brake beams and associated parts of the operating mechanism so that the beams are adapted to be moved out of the profile of the cars, so that they may be disposed at a considerable height above the rails.

For the purpose of explaining the invention an example embodying the same has been shown in the accompanying drawings, in which the same reference characters have been used in all the views to indicate corresponding parts. In said drawings,—

Fig. 1 is a diagrammatical plan view showing a part of the track equipped with my improved brake system, Fig. 2 is a section taken longitudinally of the track and showing the parts of the brake mechanism, Fig. 3 is a partial section taken on the line 3—3 of Fig. 2, and Fig. 4 is a partial plan view of Fig. 2 with the brake beams and rail partly broken away.

In the example shown in the drawings my improved track brake comprises pairs of I-shaped beams 2 provided with brake shoes 6 of wood and disposed alongside and on opposite sides of each rail 1. The beams are supported with their webs on brackets 12 projecting from chairs 10 secured to transverse frames composed of beams 11 and end pieces 15 and they are movable on said brackets transversely of the track and towards and away from the rails 1. Each beam is connected near its ends with arms 3 secured to vertical rock shafts 4 mounted in the chairs 10. To the bottom ends of the shafts 4 arms 5 are secured, which are connected with the piston rods 13 of fluid pressure cylinders 7 secured to the bottom side of the beams 11. As is best shown in Fig. 1, each beam 2 is connected with two pressure cylinders 7, and all the pressure cylinders are connected through pipes 8 including a controlling valve 9 with a supply of a suitable pressure fluid such as compressed air. The valve 9 is operated by a lever 14, and it is adapted to regulate the pressure of the fluid admitted to the cylinders 7 from zero to a maximum for regulating the braking power of the beams 2, as is indicated by the diagram $o—p$ shown in Fig. 1. Valves of this type are known in the art, and I deem it not necessary to describe the construction in detail, but I wish to make reference to my German Patent No. 354,769 showing one example of a valve suitable in my system.

As appears more particularly from Fig. 1, a complete set of brakes comprises four brake beams 2, two pairs of beams being disposed on corresponding sections of the rails. Therefore, both wheels of each axle are simultaneously braked.

The operation of the brake system is as follows: For braking a car passing through the brake system the attendant operates the valve 9 for admitting the pressure fluid to the cylinders 7. Thereby the pistons are forced outwardly and the beams 2 are pressed towards the rails and into braking positions, the end positions of the beams being determined by the flanges of the beams engaging the brackets 12. If now the car passes through the brake, the rims of the wheels are engaged from opposite sides by the shoes 6 of the beams 2 which are spread apart according to the breadth of the rims. By connecting each arm 5 to a cylinder 7 of its own and admitting fluid of the same pressure to all the cylinders, each beam is pressed against the wheel all over its length with uniform pressure, and the same pressure is exerted by the beams of a pair on opposite sides of the wheels, so that the lateral forces acting on the wheels are balanced. Further, the braking effect is the same on both sides of the car. By regulating the pressure of the fluid by means of the valve 9 the attendant can adapt the braking power to various conditions such as the velocity and weight of the car passing into the brake system, the desired reduction of the velocity of the car, the condition of the shoes 6, influences of weather and wind on the braking effect, etc. The regulation of the pressure is simple and reliable, and it can be effected also while the car passes through the brake. In some cases I dispose a plurality of brakes one behind the other.

An important field of application of my improved brake is the shunting of trains by means of double inclines.

I have found that in many cases a sufficient braking power is developed when mounting the brake beams so as to engage the bottom part of the wheels, so that the brake beams may be disposed so as not to interfere with the traffic. However, in some cases it is desirable to increase the braking effect by increasing the surfaces of the wheel rims engaged by the brake beams 2. For this purpose I dispose the beams as high as is possible in view of the profile of the cars to be braked, and I mount the same so that they are adapted to be moved out of operative positions and into positions in which they do not interfere with other cars. In the figures I have shown an example in which the brake beams and associated parts are mounted for being raised and lowered. As shown the beams 11 are supported at their ends on guiding members 21 by means of which they are guided on vertical rails 22. Trunnions 23 of the frame 11, 11 are connected by links 24 with arms 25 secured to rock shafts 26. To the said rock shafts arms 27 are keyed, which are jointed at their top ends to the piston rods 28 of pressure cylinders 29 having a supply of a suitable pressure fluid through pipes 16. The arms 27 of adjacent shafts 26 are connected by links 30 insuring uniform movement of the beam 2 at both ends. It will be understood that each frame 11, 11 supports four beams 2, two for each rail, and that the frame is connected by two links 24 and arms 25 with the same shaft 26.

In the position of the parts shown in Fig. 2 the beams 2 are in elevated or operative positions, the pressure fluid being admitted to the cylinders 12 at the right hand sides of the pistons. For moving the beams 2 into inoperative positions the pressure fluid is allowed to escape from the cylinders 29, whereupon the beams drop into inoperative position by gravity.

While in describing the invention reference has been made to a particular example embodying the same, I wish it to be understood that my invention is not limited to the construction shown in the drawings, and that various changes may be made in the general arrangement of the system and the construction of its parts without departing from the invention.

I claim:

1. In a track brake, the combination, with a rail, of a pair of elongated brake members disposed alongside said rail and at opposite sides thereof, and elastic operating means for each of said brake members each including pistons individually connected with each of said members for exerting braking forces thereon, and means to cause a fluid to operate said pistons.

2. In a track brake, the combination, with a rail, of a pair of elongated brake members disposed alongside said rail and at opposite sides thereof, pistons individually connected with said brake members for exerting braking forces thereon, and means to cause an elastic fluid to operate said pistons.

3. In a track brake, the combination, with a rail, of a pair of elongated brake members disposed alongside said rail and at opposite sides thereof, and elastic operating means individual to each of said members each including fluid operated means of its own for exerting braking forces on said members.

4. In a track brake, the combination, with a rail, of a pair of elongated brake members disposed alongside said rail and at opposite sides thereof, operating means individual to each of said members each including fluid operated means of its own for exerting braking forces on said members, and means to supply elastic fluid to said fluid operated means.

5. In a track brake, the combination, with the rails of the track, of elongated brake beams disposed at opposite sides of each rail, fluid operated cylinders and pistons individually connected two with each beam for forcing the same towards the rails, and means to supply an elastic fluid to said cylinders.

6. In a track brake, the combination, with a rail, of an elongated brake member disposed alongside said rail, a link disposed alongside said brake member and having a fixed fulcrum and directly jointed to said brake member, and means connected with said link for moving the brake member towards and away from the rail.

7. In a track brake, the combination, with a rail, a brake member alongside said rail and adapted for braking engagement with the wheels of a vehicle moving on said rail, means to move the brake upwardly and downwardly and into and out of position ready for braking, and means to operate the brake.

8. In a track brake, the combination, with the rail of a track, of a pair of elongated brake members, operating mechanism therefor including fluid operated cylinders, means to move said brake members and operating mechanisms upwardly and downwardly and into and out of position ready for braking, and means to supply pressure fluid to said cylinders.

9. In a track brake, the combination, with the track, of brake beams disposed on opposite sides of the rails of the track and adapted for braking engagement with the wheels of a vehicle moving on said track, fluid operated cylinders and pistons connected with said brake beams for forcing the same towards the rails, a vertically movable frame on which said beams and cylinders are mounted, means to move said frame in vertical direction with the brake beams into and out of braking positions, and means to supply a pressure fluid to said cylinders.

10. In a track brake, the combination, with a rail, a brake member alongside said rail and adapted for braking engagement with the wheels of a vehicle moving on said rail, and means to move said brake member into and out of the profile of the vehicles and into and out of position for braking engagement with the wheels of the vehicle.

In testimony whereof I hereunto affix my signature.

FRANZ JORDAN.